Sept. 15, 1964  F. A. BIANCHI  3,148,668
INTERNAL COMBUSTION ENGINE
Filed Feb. 27, 1963

*INVENTOR.*
FERMO A. BIANCHI
BY
*Moner Altman*

ATTORNEYS

United States Patent Office 3,148,668
Patented Sept. 15, 1964

3,148,668
INTERNAL COMBUSTION ENGINE
Fermo A. Bianchi, % Carlo Bianchi & Company, Inc.,
24 Union Ave., Framingham Center, Mass.
Filed Feb. 27, 1963, Ser. No. 261,301
6 Claims. (Cl. 123—32)

This application is a continuation-in-part of my co-pending application Serial No. 150,220, filed November 6, 1961, for Internal Combustion Engine, and subsequently abandoned. The invention relates to internal combustion engines of the two-stroke cycle piston type and the mode of operating the same. It is an object of the invention to provide an engine in which every down-stroke of the piston will be a power stroke and every up-stroke will be against negligible resistance, the up-strokes being used merely to push out through an exhaust port the combustion gases produced in the cylinder during the preceding power stroke. When the piston has traveled at least four-fifths of its up-stroke and is near the top of the up-stroke, the exhaust valve is closed and a charge of air which has been pre-compressed sufficiently for combustion requirements, that is, to pressures in excess of 75 pounds per square inch, is forced into the cylinder and the inlet valve is shut, whereupon a charge of fuel is injected into the cylinder to mix with the compressed air therein and the mixture is ignited by any appropriate means, such as a spark, a glowing point or plate, or the temperature of the charge of air introduced just before the fuel is injected.

The air is supplied to the cylinders from a reservoir of sufficient size to supply charges of air to the cylinders with only minor fluctuations of pressure in the reservoir, the pressure therein being maintained approximately constant by compressors of suitable type and adequate capacity. The amounts of air supplied to the cylinders can thus be easily varied in accordance with changes in power requirements by controlled operation of the inlet valves which admit charges of air to the cylinders, or by changing the pressure maintained in the reservoir. Corresponding variations may be made in the amounts of fuel injected.

For a more complete understanding of the invention, reference may be had to the following description thereof and to the drawings, of which FIGURES 1 to 4 are diagrammatic illustrations of the cylinder and piston of an internal combustion engine, showing different positions of the moving parts.

Figures 1, 2:
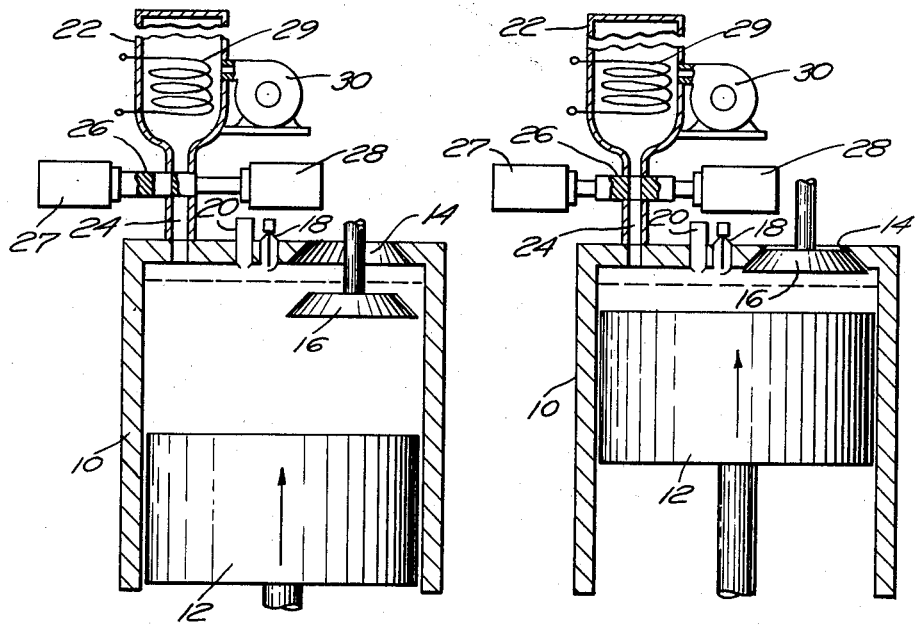

The upper portion of a cylinder of an internal combustion engine is diagrammatically indicated at 10. Within the cylinder a piston 12 is indicated in FIGURE 1 at the bottom of its stroke. An exhaust port 14 at the top of the cylinder is provided with a poppet valve 16 by which it can be closed. A spark plug 18 is conventionally indicated as well as a nozzle 20 for injection of fuel by any suitable means such, for example, as injectors of the kind used on diesel engines.

According to the present invention, an air reservoir 22 is mounted close to the top of the cylinder 10 to communicate therewith through a passage 24 which may be stream-lined where it leaves the reservoir so as to minimize turbulence in the reservoir and to promote rapid flow of air charges from the reservoir. The passage 24 is normally closed by a quick-acting valve such, for example, as the valve 26 which may be operated by solenoids 27 and 28, cams or any other suitable means. No fuel is admitted into this reservoir.

Compressor means comprising one or more compressors of adequate capacity are provided to maintain the pressure in the reservoir nearly constant at a selected value which is in excess of 75 pounds per square inch and may be as high as 700 pounds per square inch, in spite of the charges of pre-compressed air discharged therefrom into the cylinders. Such compressors may be of any desired type, a rotary compressor 30 being indicated on the drawing by way of example.

During the operation of the motor the action of the compressors maintaining the reservoir pressure at a high level will result in a substantial rise in temperature of the supplied air as it is being compressed. It may, however, be desirable to raise the temperautre in the reservoir still further to offset the momentary drop in the temperature of a charge of air as it is admitted into the cylinder, or to have the charge of air sufficiently hot to fire the fuel which is injected the instant after the air inlet valve closes to sever communication between the cylinder and the reservoir. This added heat may be had by any suitable means such as one or more electric heating coils 29, a heat-exchange unit utilizing hot exhaust gases, or an independent burner.

Figures 3, 4:
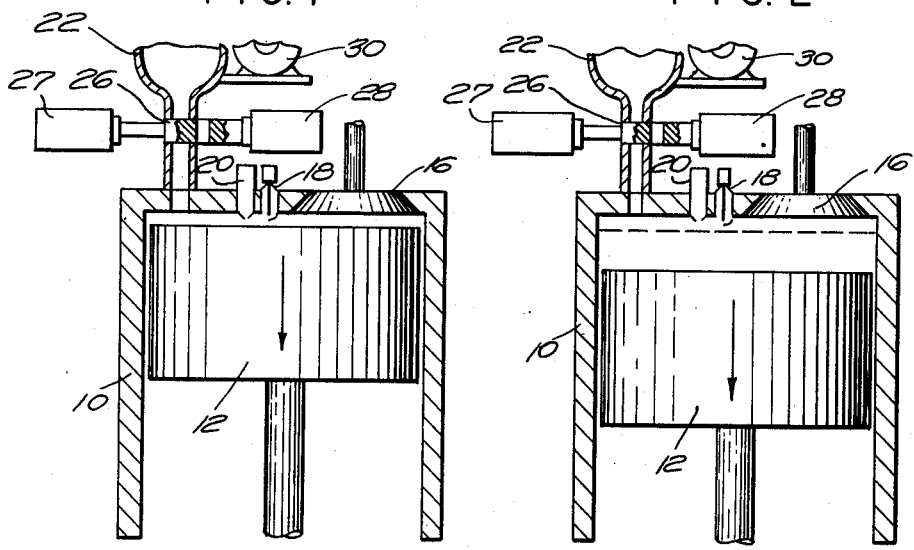

Injection of fuel-free air into the cylinder takes place when the piston is near the top of its up-stroke, that is, after it has completed at least four-fifths of the up-stroke. At that instant the air inlet valve 26 is opened as the exhaust port is being closed by the valve 16, as indicated in FIGURE 2, and remains open long enough after the valve 16 is fully closed to fill the space above the piston 12 with compressed air at substantially reservoir pressure. Fuel is then injected into the cylinder through the nozzle 20 before the piston starts on its down-stroke as indicated in FIGURE 3 and is ignited by any suitable means such, for example, as a spark plug 18, a hot wire, or the elevated temperature of the air charge itself. The air valve 26 and exhaust valve 16 remain closed during the down-stroke of the piston 12, as indicated in FIGURE 4. When the piston reaches the bottom of its stroke, the exhaust valve opens so that the combustion gases can be scavenged by the up-stroke of the piston which is against negligible back-pressure, as indicated in FIGURE 1. As the piston nears the top of its up-stroke, the cycle is repeated as described.

The compressor 30 which is employed to keep the reservoir supplied with air at high pressure is preferably of the rotary type for economy. A quick-acting piston may be employed to force the charges of pre-compressed air from the reservoir into the top of the cylinder. In a multi-cylinder engine a single reservoir 22 of suitable size may be employed to provide air blasts for some or all of the cylinders, or a separate reservoir may be provided for each cylinder. Conventional timing means, well known in the art, may be employed to cause the valves, spark plug and fuel injector to operate in any desired timed relation.

I claim:
1. A method of operating an internal combustion engine including a cylinder, a piston therein, and an exhaust port, which comprises maintaining adjacent to said cylinder a supply of compressed fuel-free air discharging a charge of said fuel-free pre-compressed air into said cylinder after the piston has completed at least four-fifths of each up-stroke, cutting off communication between the cylinder and the air supply, and then injecting fuel into the cylinder.

2. A method of operating an internal combustion engine including a cylinder, a piston therein, and an exhaust port, which comprises maintaining a supply of highly compressed fuel-free air in a reservoir adjacent to said cylinder, maintaining said exhaust port open during at least four-fifths of each up-stroke of the piston, maintaining the exhaust port closed from near the top of each up-stroke of the piston to near the bottom of the following down-stroke, opening communication briefly between the reservoir and the cylinder as said exhaust port is closing, injecting fuel into the cylinder after said communication is cut off, and igniting the fuel in the cylinder.

3. A method of operating an internal combustion engine including a cylinder and a piston therein, which comprises maintaining adjacent to said cylinder a sufficient supply of pre-compressed fuel-free air to provide charges of air to the cylinder without material fluctuations in the pressure of the supply, discharging from said supply into said cylinder at each up-stroke of the piston a charge of fully pre-compressed fuel-free air when the piston is near the top of its up-stroke, and injecting fuel into the cylinder when said supply has been cut off from the cylinder.

4. A method as described in claim 3, plus the step of conforming the power output of the engine to load requirements by varying the amounts of fuel-free air in the charges supplied to the cylinder, and correspondingly varying the amounts of fuel injected into the cylinder.

5. In an internal combustion engine including a cylinder, a piston reciprocable therein, and an exhaust port; an exhaust valve in said port, means for opening said valve when the piston is near the end of each down-stroke and for closing said valve when the piston is near the top of each up-stroke, an air reservoir, means for maintaining at an approximately constant pressure highly compressed fuel-free air in said reservoir sufficiently pre-compressed for combustion requirements, a quick-acting valve operable to admit fuel-free air from said reservoir into said cylinder when the piston is near the top of each up-stroke and as said exhaust valve is closing, and means for injecting fuel directly into said cylinder after said exhaust and air valves are closed and before said piston starts each down-stroke.

6. In an internal combustion engine including a cylinder, a piston reciprocable therein, and an exhaust port; an air reservoir communicating with the upper portion of said cylinder, means for maintaining in said reservoir at an approximately constant high pressure fuel-free air which is sufficiently pre-compressed for combustion requirements, a quick-acting valve between said reservoir and said cylinder, means for injecting fuel directly into said cylinder independently of the air supply, and means for igniting fuel in said cylinder.

References Cited in the file of this patent

UNITED STATES PATENTS

| | | |
|---|---|---|
| 1,478,357 | Powell | Dec. 18, 1923 |
| 1,512,673 | Breguet | Oct. 21, 1924 |
| 1,609,371 | Leissner | Dec. 7, 1926 |
| 2,292,233 | Lysolm | Aug. 4, 1942 |
| 2,594,845 | Baumann | Apr. 29, 1952 |
| 2,887,993 | Shallenberg | May 26, 1959 |

FOREIGN PATENTS

| | | |
|---|---|---|
| 62,934 | Switzerland | Dec. 31, 1912 |